Oct. 29, 1946.   E. I. ANDERSON   2,410,000
PULSE SELECTIVITY SYSTEM
Filed Nov. 18, 1943
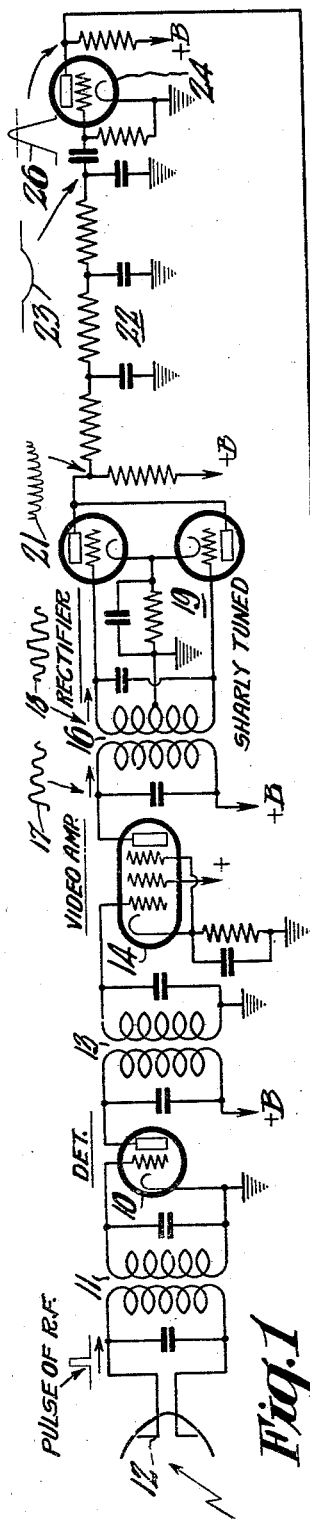
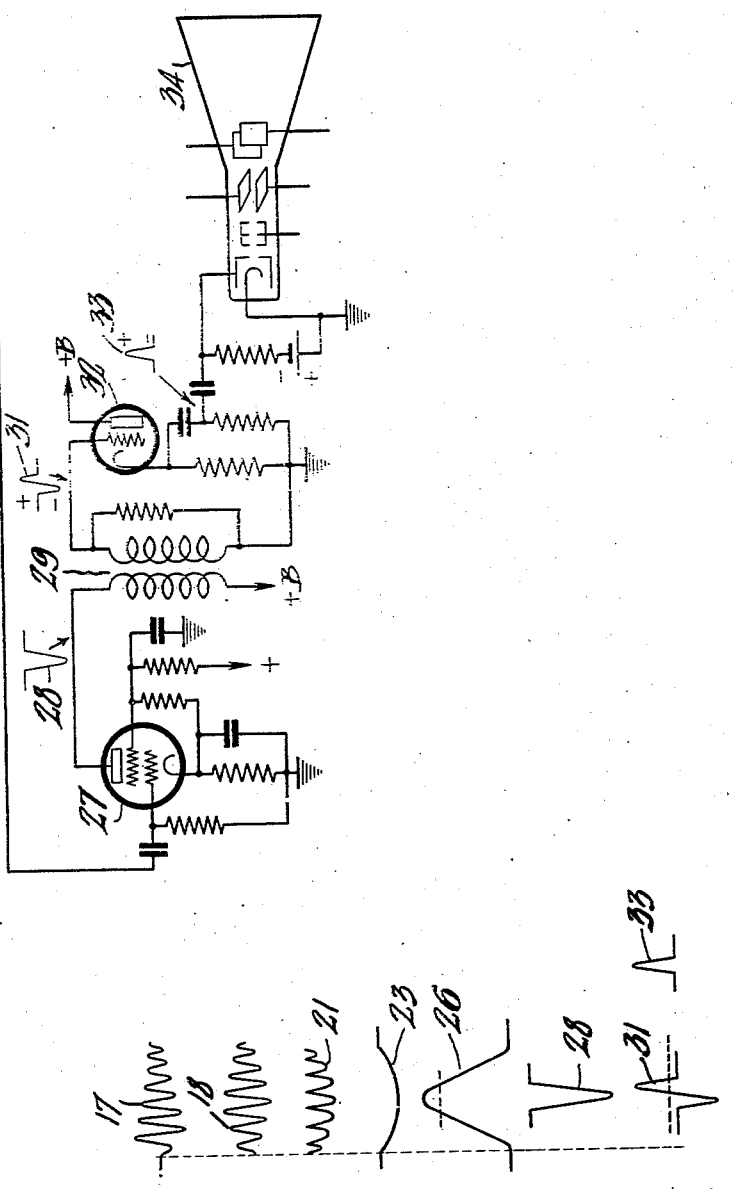
Inventor
Earl I. Anderson
By
Attorney Patented Oct. 29, 1946

2,410,000

UNITED STATES PATENT OFFICE 2,410,000

PULSE SELECTIVITY SYSTEM

Earl I. Anderson, Manhasset, N. Y., assignor to Radio Corporation of America, a corporation of Delaware Application November 18, 1943, Serial No. 510,776

5 Claims. (Cl. 250—20)

My invention relates to systems for receiving electrical pulses and particularly to receivers for pulse-echo systems or the like.

An object of the invention is to provide an improved radio pulse receiver.

A further object of the invention is to provide an improved method of and means for obtaining a suitable signal-to-noise ratio in a pulse receiver.

A further object of the invention is to provide an improved means for and method of obtaining a delayed pulse.

According to a preferred embodiment of the invention, the received pulses of radio frequency energy are demodulated and the resulting video frequency pulses are applied to a sharply tuned circuit, whereby each pulse is converted into a damped sine wave. The damped wave is then integrated and amplified whereby a broad amplified pulse is obtained. The amplified pulse is then clipped near its peak and again amplified to obtain a narrowed pulse with steep sides. The steep-sided pulse is then differentiated to obtain a very narrow pulse corresponding to the received pulse of radio frequency energy, but delayed in time with respect thereto. Since the sharply tuned circuit passes only a narrow frequency band, there is a reduction in the amount of noise signals that are passed by the receiver. Preferably, the sharply tuned circuit is tuned to a frequency having a period equal to twice the duration of the applied pulse.

The invention will be better understood from the following description taken in connection with the accompanying drawing in which Figure 1 is a circuit diagram of a pulse receiver embodying the invention, and Figure 2 is a group of graphs that are referred to in explaining the invention. In the two figures similar graphs are indicated by similar reference numbers.

Fig. 1 shows a pulse-echo receiver comprising a detector 10 coupled through a broadly tuned circuit 11 to an antenna 12. The video frequency pulses appearing in the detector output are passed through a broadly tuned transformer 13 to an amplifier tube 14 which applies the amplified pulses to a transformer 16 which, in accordance with my invention, is sharply tuned. Assuming that the width or duration of each pulse is 0.5 microsecond, the transformer 16 preferably is tuned to a frequency of one megacycle per second. The repetition rate of the pulses may be 15 kilocycles per second, for example.

There then appears across the primary of transformer 16 the damped sine wave 17 and across the secondary of transformer 16 the damped sine wave 18; these waves and the pulses referred to below are also shown in Fig. 2. The damped wave 18 is rectified by a rectifier 19, preferably of the double wave type, to produce the wave 21.

The rectified wave 21 is next integrated by suitable means such as the resistor capacitor filter 22 to produce a broad pulse 23. The pulse 23 is amplified by an amplifier 24 to obtain a pulse 26 which is applied to a vacuum tube 27 that is biased beyond cut-off to pass only the peak of the pulse 26.

The amplified peak of pulse 26 appears at the anode of the tube 27 as a narrow amplified pulse 28. The pulse 28 is then differentiated by any suitable differentiating circuit such as a transformer 29, whereby the derivative voltage pulse 31 is obtained. The pulse 31 may then be clipped by a cathode follower tube 32 to obtain the positive portion only of pulse 31 as indicated at 33. The narrow pulse 33 corresponds to the received 0.5 microsecond pulse and has a fixed time delay with respect thereto. The pulse 33 may be applied to a cathode ray tube indicator 34 or utilized in any other desired way.

Fig. 2 shows the time relations of the various waves and pulses referred to above.

The invention may be employed solely for the purpose of delaying a pulse, if desired. In cases where the invention is employed for the purpose of improving the signal-to-noise ratio and where no delay of the pulse is required, the amount of delay necessarily introduced may be taken into account when calibrating the apparatus.

The invention may be particularly useful in relay stations for extending their operating range since their limit of range is usually reached when receiver hiss and other noise fire or trigger the relay transmitter too frequently and increase its duty cycle too much. The above described system selects the desired pulses and discriminates against noise. At the same time the necessary pulse timing accuracy is maintained.

I claim as my invention:

1. In a receiver for receiving pulses of energy which are of short duration compared with the period between successive pulses, a detector for converting said received pulses to video frequency electrical pulses, a circuit that is tuned to a frequency that is high as compared with the repetition frequency of said video frequency pulses, means for applying said video frequency pulses to said tuned circuit, means for rectifying and integrating the resulting damped sine waves appearing across said tuned circuit whereby broad pulses are obtained, means for amplifying said broad pulses, and means for obtaining from each broad pulse a narrow pulse corresponding to the pulse applied to said tuned circuit.

2. The invention according to claim 1 wherein said tuned circuit is tuned to a frequency having a period equal to twice the duration of each applied pulse.

3. In combination, a sharply tuned circuit, means for applying electrical pulses to said circuit which are of short duration compared with the period between successive pulses and which have a low repetition frequency as compared with the frequency to which said circuit is tuned, means for rectifying and integrating the resulting damped sine waves appearing across said tuned circuit whereby broad pulses are obtained, means for amplifying said broad pulses, and means for obtaining from said amplified pulses narrow pulses corresponding to the pulses applied to said tuned circuit.

4. In a receiver for receiving pulses of energy which are of short duration compared with the period between successive pulses, a detector for converting said received pulses to video frequency electrical pulses, a circuit that is tuned to a frequency that is high as compared with the repetition frequency of said video frequency pulses, means for applying said video frequency pulses to said tuned circuit, means for rectifying and integrating the resulting damped sine waves appearing across said tuned circuit whereby broad pulses are obtained, means for amplifying said broad pulses, means for clipping off the peak portion of said amplified pulse and then amplifying said peak portion to produce a steep-sided pulse, and means for obtaining from said steep-sided pulse a narrow pulse corresponding to the pulse applied to said tuned circuit.

5. In combination, a sharply tuned circuit, means for applying electrical pulses to said circuit which are of short duration compared with the period between successive pulses and which have a low repetition frequency as compared with the frequency to which said circuit is tuned, means for rectifying and integrating the resulting damped sine waves appearing across said tuned circuit whereby broad pulses are obtained, means for amplifying said broad pulses, means for clipping off the peak portion of each amplified pulse and then amplifying said peak portions to produce steep-sided pulses, and means for differentiating said steep-sided pulses to obtain narrow delayed pulses corresponding to the pulses applied to said tuned circuit.

EARL I. ANDERSON.